(12) United States Patent
Mattsson et al.

(10) Patent No.: US 9,998,314 B1
(45) Date of Patent: Jun. 12, 2018

(54) PEAK-TO-AVERAGE REDUCTION WITH POST-AMPLIFIER FILTER

(71) Applicant: GATESAIR, INC., Mason, OH (US)

(72) Inventors: Anders Mattsson, San Diego, CA (US); Kevin Berndsen, Cincinnati, OH (US)

(73) Assignee: Gatesair, Inc., Cincinnatti, OH (US)

( * ) Notice: Subject to any disclaimer, the term of this patent is extended or adjusted under 35 U.S.C. 154(b) by 0 days. days.

(21) Appl. No.: 15/377,650

(22) Filed: Dec. 13, 2016

(51) Int. Cl.
- H04B 1/04 (2006.01)
- H04L 27/26 (2006.01)
- H04L 12/18 (2006.01)
- H04L 27/34 (2006.01)

(52) U.S. Cl.
CPC ....... H04L 27/2623 (2013.01); H04B 1/0475 (2013.01); H04L 12/18 (2013.01); H04L 27/3411 (2013.01); H04B 2001/0408 (2013.01)

(58) Field of Classification Search
CPC . H04L 27/2623; H04L 27/3411; H04L 12/18; H04B 1/0456; H04B 2001/0408; H04B 1/0475
See application file for complete search history.

(56) References Cited

U.S. PATENT DOCUMENTS

| 7,675,982 | B2 | 3/2010 | Zhang et al. | |
| 8,503,950 | B1 * | 8/2013 | Dick | H04B 1/0475 375/295 |
| 2002/0101936 | A1 * | 8/2002 | Wright | H04L 25/03834 375/296 |
| 2004/0141548 | A1 | 7/2004 | Shattil | |
| 2004/0218689 | A1 * | 11/2004 | Akhtman | H04L 27/2624 375/296 |
| 2008/0150625 | A1 * | 6/2008 | Sundstrom | H04L 27/2624 327/551 |
| 2011/0075745 | A1 | 3/2011 | Kleider et al. | |
| 2011/0092173 | A1 | 4/2011 | Mccallister et al. | |
| 2013/0003627 | A1 | 1/2013 | Kravtsov | |
| 2016/0261445 | A1 * | 9/2016 | Ishikawa | H04L 27/2623 |

OTHER PUBLICATIONS

Luqing Wang, et al., "Clipping-Noise Guided Sign-Selection for PAR Reduction in OFDM Systems", IEE Transactions on Signal Processing, vol. 56 No. 11, Nov. 2008, p. 5644-5653.

(Continued)

*Primary Examiner* — Syed Haider
(74) *Attorney, Agent, or Firm* — Tarolli, Sundheim, Covell & Tummino LLP

(57) ABSTRACT

Systems and methods are provided for broadcasting a for broadcasting a modulated signal. A plurality of peaks is detected within a waveform envelope signal of the modulated signal. For each of the plurality of peaks, a pulse having substantial spectral content that is outside of a passband of a high power filter is constructed. The constructed pulse for each peak is subtracted from its associated peak to provide a peak-reduced signal. The peak-reduced signal is amplified at a power amplifier to provide an amplified signal. The amplified signal is filtered at the high power filter to provide a filtered signal. The filtered signal is broadcast at an associated antenna.

17 Claims, 3 Drawing Sheets

(56) References Cited

OTHER PUBLICATIONS

Md. Munjure Mowla, et al., "Performance Improvement of PPR Reduction for OFDM Signal in LTE System", International Journal of Wireless & Mobile Networks (IJWMN) vol. 5, No. 4, Aug. 2013, pp. 35-47.
Christian Siegl, et al., "Out-of-Band Power Reduction using Selected Mapping with Power-Amplifier-Oriented Metrics", Article, Sep. 2009, 5 pgs.
Jean Armstrong, "Peak-to-Average Power Reduction in Digital Television Transmitters", Article, Feb. 2002, 6 pgs.
Tao Jiang, et al., "An Overview: Peak-to-Average Power Ratio Reduction Techniques for OFDM Signals", IEEE Transactions on Broadcasting, vol. 54. No. 2, Jun. 2008, p. 257-268.
Applicant: Gatesair, Inc.; International Application No. PCT/US2016/066394, Filed: Dec. 13, 2016, "International Search Report and Written Opinion"; Authorized Officer: Sang Bum Chin, dated Sep. 12, 2017; 12 pp.

* cited by examiner

PEAK-TO-AVERAGE REDUCTION WITH POST-AMPLIFIER FILTER

TECHNICAL FIELD

This invention relates to broadcasting, and more particularly, to of peak-to-average reduction of a waveform to be amplified.

BACKGROUND OF THE INVENTION

Orthogonal frequency-division multiplexing (OFDM) is a method of encoding digital data on multiple carrier frequencies that has developed into a popular scheme for wideband digital communications. Some challenging issues remain unresolved in the design of the OFDM systems, including the high Peak-to-Average Power Ratio (PAPR) of transmitted OFDM signals. Most radio systems employ a high power amplifier (HPA) in the transmitter to obtain sufficient transmissions power and the HPA is usually operated at or near the saturation region to achieve the maximum output power efficiency. Accordingly, nonlinear distortion due to high PAPR of the input signals can be introduced into the communication channels. If the HPA is not operated in linear region with large power back-off, it is difficult to keep the out-of-band power below the specified limits. This situation can lead to very inefficient amplification and expensive transmitters.

SUMMARY

In accordance with one aspect of the present invention, a method is provided for broadcasting a modulated signal. A plurality of peaks is detected within a waveform envelope signal of the modulated signal. For each of the plurality of peaks, a pulse having substantial spectral content that is outside of a passband of a high power filter is constructed. The constructed pulse for each peak is subtracted from its associated peak to provide a peak-reduced signal. The peak-reduced signal is amplified at a power amplifier to provide an amplified signal. The amplified signal is filtered at the high power filter to provide a filtered signal. The filtered signal is broadcast at an associated antenna.

In accordance with another aspect of the present invention, a transmitter system includes a high power filter having a frequency passband. A peak-to-average reduction component detects a plurality of peaks within a waveform envelope signal of a modulated signal, constructs, for each of the plurality of peaks, a pulse having substantial spectral content that is outside of the passband of high power filter, and subtracts the constructed pulse for each peak from its associated peak to provide a peak-reduced signal. A power amplifier amplifies the peak-reduced signal at a power amplifier to provide an amplified signal. The high power filter filters the amplified signal to provide a filtered signal, and an antenna that broadcasts the filtered signal.

In accordance with yet another aspect of the present invention, a transmitter system includes a high power filter having a frequency passband. A peak-to-average reduction component detects a plurality of peaks within a waveform envelope signal of a modulated signal, constructs, for each of the plurality of peaks, a pulse having substantial spectral content that is outside of the passband of high power filter, and subtracts the constructed pulse for each peak from its associated peak to provide a peak-reduced signal. The peak-to-average reduction component includes a stored basis set of wavelets having spectral content that is substantially outside of a passband of the high power filter. The basis set of wavelets include delayed, overlapping versions of a selected wavelet. A sample extractor extracts a set of samples from the waveform envelope signal around a location of the peak, and an optimization component that determines weights for the basis set of wavelets that, when applied to the basis set, approximate the extracted set of samples from around the location of the peak. A power amplifier amplifies the peak-reduced signal at a power amplifier to provide an amplified signal. The high power filter filters the amplified signal to provide a filtered signal, and an antenna that broadcasts the filtered signal.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
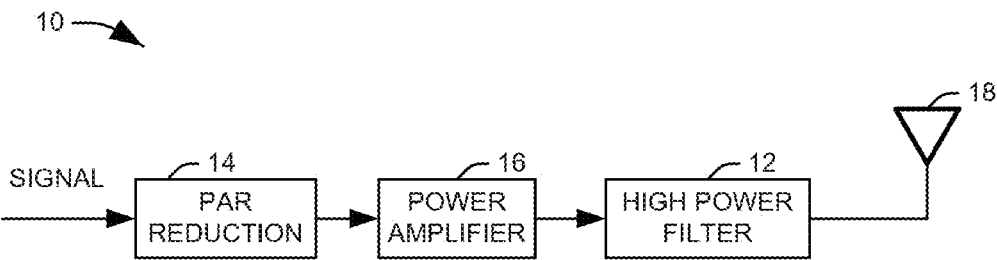
FIG. 1 illustrates one example of a transmitter system that utilizes the peak-to-average reduction of the present invention in broadcasting a modulated signal.

In the context of the present disclosure, the singular forms "a," "an" and "the" can also include the plural forms, unless the context clearly indicates otherwise. The terms "comprises" and/or "comprising," as used herein, can specify the presence of stated features, steps, operations, elements, and/or components, but do not preclude the presence or addition of one or more other features, steps, operations, elements, and components.

Systems and methods in accordance with aspects of the invention can be applied to improve the peak-to-average ratio while considering the allowable level of distortion in a transmitted signal. The inventors have recognized that the value of a reduced peak to average signal is relevant in the final amplification of the signal, but not necessarily in the transmitted signal. Specifically, the cost of the amplifying system is driven by the peak-to-average ratio of the signal, but the transmission system after amplification is not as sensitive to the peak-to-average ratio. Further, the distortion to the reference signal has a spectral density that depends on the distorting method. Any linear system that acts on the amplified signal acts on the distortion as well.

The inventors have exploited these facts to provide a system with a novel type of distortion related to peak-to-average ratio reduction. Since broadcast transmitters already utilize high power filters to meet spectral requirements, the system places a signal in the out of band part of the filter such the peak to average of the signal going into the power amplifier is reduced. When the amplified signal then enters the high power filter the out of band components introduced by the peak to average reduction are filtered away. This has the advantage of creating a signal into the power amplifier that has a significantly reduced peak to average, allowing the amplifier to operate at a higher average power. The transmitted signal out of the high power filter is mask compliant and can be produced with little or no in-band distortion. Effectively, the high power filter becomes a part of the pulse shaping for the peak-to-average reduction, with the high power filter reconstructing the peak in the signal after amplification. In general, while previous systems traded in-band distortion or in-band energy for peak-reduction, this system trades bandwidth for peak reduction. It must be noted that this tradeoff of bandwidth is in excess of the increased out-of-band energy that is generated by a simple "clipping" technique.

In 64 QAM OFDM, where each carrier in the orthogonal frequency division multiplexing (OFDM) system uses 64-level quadrature amplitude modulation (QAM), an many other bandwidth efficient modulation schemes, the required Signal to Noise (SNR) is that high that reducing the peak to average by adding an in-band signal can only give a very modest reduction in peak to average reduction. Clipping of a signal can be seen as adding or subtracting a second signal, $x_t$, to a first one, $y_t$, such that high peaks gets canceled out, such that the final signal, $z_t$, can be expressed as $z_t=y_t-x_t$, with $|z_t| \le Cl$, where Cl is a selected clipping level. One option for $x_t$ is to set it to zero when $|y_t| \le Cl$. In general, this will cause both $x_t$ and $z_t$ to be wideband signals, which can result in signals that are not mask compliant. Furthermore the in-band distortion can be too high such that modulation error ratio (MER) or signal to noise ratio (SNR) limits are violated. To keep the signal mask compliant, the inventors have determined methods for finding a signal, $x_t$, which has the same, or almost the same, bandwidth as $y_t$ and adds minimal distortion to the signal. If there is a high power filter available, then one can pick a function, $x_t$, that has most, or all, of its spectral content outside the bandwidth of the filter, and exploit the presence of the filter to attenuate the out-of-band distortion.

FIG. 1 illustrates one example of a transmitter system 10 that utilizes the peak-to-average reduction of the present invention in broadcasting a modulated RF signal. In one implementation, the modulated signal can be an orthogonal frequency division multiplexed (OFDM) signal, with a plurality of channels in the OFDM signal each carrying a signal utilizing quadrature amplitude modulation (QAM). The transmitter system 10 includes a high power filter 12 having at least one frequency passband and at least one frequency stopband. In one implementation, the high power filter 12 is selected to have a low transition bandwidth to ensure that the system meets emission requirements. In this region, there is little that the high power filter can do to decrease any distortion generated at a peak-to-average reduction (PAR) component 14.

The PAR component 14 receives a waveform envelope signal of the modulated signal and applies peak-to-average reduction to the signal. It will be appreciated that the peak-to-average reduction component 14 can be implemented as computer instructions stored on a non-transitory computer readable medium and executed by an associated processor, a set of dedicated hardware components configured to perform the appropriate logic, or a combination of software and dedicated hardware. To this end, the PAR component 14 detects a plurality of peaks within the waveform envelope signal. In one implementation, the PAR component applies a clipping function to the waveform envelope signal to provide a magnitude-limited signal and subtracts the magnitude-limited signal from the waveform envelope signal to identify the peaks.

The PAR component 14 then constructs, for each of the plurality of peaks, a pulse having substantial spectral content that is outside of the passband of high power filter 12 and subtracts the constructed pulse from the peak. As used herein, by "substantial spectral content" it is meant that at least half of the spectral content. It will be appreciated, however, that the construction of the pulse can vary with the implementation. For example, in one implementation, the PAR component 14 constructs the pulse such that substantially all of the spectral content of the constructed pulse is outside of the passband of the high power filter. In another implementation, the peak-to-average reduction component constructs the pulse such that the spectral content of the constructed pulse is divided between the passband of the high power filter and a stopband of the high power filter such that an in-band distortion of the filtered signal is substantially equal to a maximum allowable in-band distortion for a transmission protocol associated with the RF transmitter system. For example, a degree of in-band distortion can be deliberately introduced to reduce the out-of-band distortion, such that an attenuation applied by the high power filter 12 is sufficient to mean requirements for out-of-band emissions.

In one implementation, the PAR component 14 constructs the pulse for each of the plurality of peaks via an iterative scaling process. In this implementation, a pulse is constructed and a wavelet, generated as a complement of the pulse, is subtracted for each peak in the original signal such that the relevant peak is reduced in amplitude. In using the complement of an in-band pulse, the PAR component 14 uses a pulse-like wavelet in the time domain that is frequency limited such that there is little or no energy within the bandwidth of the filter or the transition bandwidth of the high power filter. A designed pulse shape for this application will be of longer duration than the duration of the peak in order to deliver a more precise frequency response. In one implementation, a wavelet with frequency support that is mainly outside the bandwidth of the signal can be generated as 1−sin c(t), although possible to use other pulse shapes. For example, the complement of a pulse derived from a raised cosine frequency domain shape can be used.

In each iteration, a selected pulse shape is scaled to match a magnitude of the peak and subtracted from the peak to provide an intermediate signal representing a location of the peak. The intermediate signal is then reviewed for additional peaks, and another iteration of the process is performed. This can continue until a termination condition occurs, for example, the detection of no peaks above a threshold value in the intermediate signal. At the end of this process, a clipping signal, $x_t$, has been generated as:

$$x_t = \sum_n a_n f(t-n) \qquad \text{Eq. 1}$$

where f(t) is a function representing a wavelet with frequency support that is mainly outside the passband and transition band of the high power filter, and $a_n$ is a scaling value for a time index, n.

In another implementation, then PAR component includes a stored basis set of wavelets having spectral content that is substantially outside of a passband of the high power filter 12. For example, the basis set of wavelets can include delayed, overlapping versions of a selected wavelet. In one implementation, the selected wavelet is of the form 1−sin c(t), although it will be appreciated that the selected wavelet can vary with the implementation. A sample extractor extracts a set of samples from the waveform envelope signal around a location of the peak, and an optimization component determines weights for the basis set of wavelets that, when applied to the basis set, approximate the extracted set of samples from around the location of the peak. For example, the optimization component can determine, via an appropriate optimization algorithm, a vector of weights, w, representing an optimal solution to the relationship A·w=p, where A is a matrix representing the basis set of wavelets and p is a vector containing the extracted set of samples from the waveform envelope signal. In one implementation, this is performed via a least squares optimization.

It will be appreciated that the peak-reduced signal from the PAR component 14 will contain significant out-of-band content. The peak-reduced signal 14 is provided to the power amplifier 16 which amplifies the peak-reduced signal at a power amplifier to provide an amplified signal. The amplified signal is then provided to the high power filter 12 which filters the amplified signal to provide a filtered signal. It will be appreciated that the high power filter 12 will provide significant attenuation to the out-of-band spectral content introduced by the PAR component 14, allowing the resulting signal to meet emission standards associated with the transmission protocol. The larger the transition bandwidth of the filter 12, the more distortion is required out of band. In a practical implementation, this means that for an 8 MHz wide signal with a high power filter that has 30 dB or more attenuation at +/−12 MHz for a transition bandwidth of 2 MHz on each side, the out of band power that needs to be filtered away is 1% or less of the total power. The filtered signal is then broadcast at an antenna 18.

Figure 2:
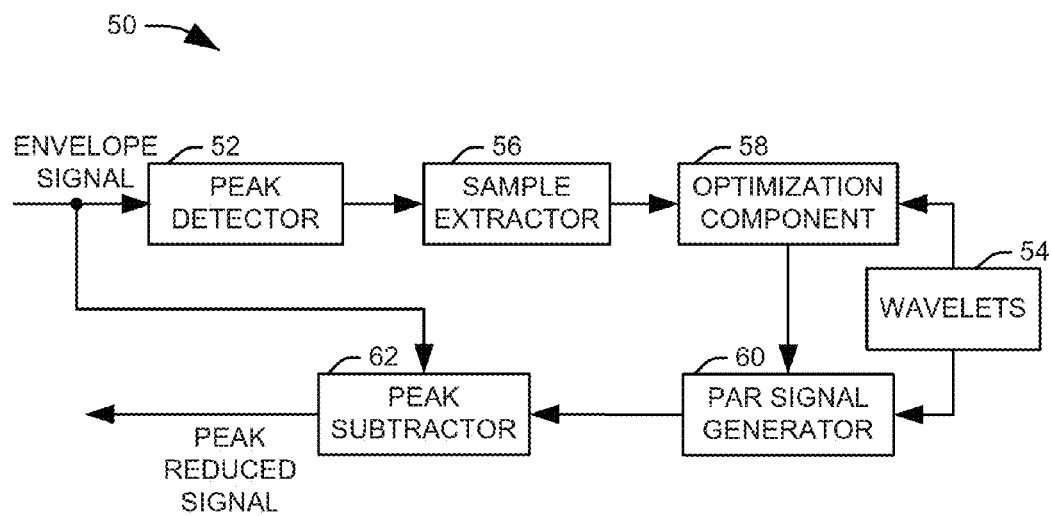
FIG. 2 illustrates a functional block diagram of one example of a peak-to-average reduction component in accordance with an aspect of the present invention.

FIG. 2 illustrates a functional block diagram of one example of a peak-to-average reduction component 50 in accordance with an aspect of the present invention. The peak-to-average reduction component 50 includes a peak detector 52 that locates peaks within a waveform envelope signal taken from a modulated signal. The original signal is complex, with some samples having a magnitude which exceeds a threshold value, T. In the illustrated implementation, the peak detector 52 passes the waveform envelope signal through a clipping function to produce a magnitude-limited version of the original signal. The peak detector 52 then subtracts the magnitude-limited version of the signal from the original signal to provide a signal, pks(n), representing only the peak values in the original signal. The peak detector 52 can then apply a peak detection algorithm to pks(n) to determine the presence and location of each peak, such that:

$$pkd[n] = \begin{cases} 1 & |pks[n-1]| < |pks[n]| > |pks[n+1]| \\ 0 & \text{otherwise} \end{cases} \quad \text{Eq. 2}$$

where pkd[n] represents the location of peak sample values.

In the illustrated implementation, each peak is matched to a stored basis set of wavelets 54 having spectral content that is substantially outside of a passband of a high power filter associated with the peak-to-average reduction component 50. For example, the basis set of wavelets can include delayed, overlapping versions of a selected wavelet. The selected wavelet can be generated to have substantial spectral content outside of a bandwidth and transition band of an associated high power filter, and in one implementation, it can be generated as a function 1−sin c(t). Each of the basis set of wavelets can be represented by a vector, $v_n$, and collectively, the basis vectors for the columns of a convolution matrix, A. Each of A and the conjugate transpose of A, $A^\dagger$, can be precalculated and stored to represent the basis set of wavelets.

For each peak center, represented by a sample index, $n_k$, for which pkd[$n_k$]=1, a sample extractor 56 extracts a set of samples, represented as a vector $p_k$, from the original signal around the peak center. In the illustrated implementation, the number of samples extracted for each peak is equal to a number of wavelets represented in the stored basis set of wavelets 54. The extracted sets of samples are then provided to an optimization component 58 that determines weights for the basis set of wavelets 54 that, when applied to the basis set, approximate the extracted set of samples from around the location of the peak. In one implementation, a vector of weights, w, are determined by a least squares optimization process such that:

$$w = A^\dagger p \quad \text{Eq. 3}$$

As the weights for each peak are calculated, they can be provided to a PAR signal generator 60 that generates a peak cancellation signal. For each peak, k, an appropriate cancellation pulse, $r_k$, can be constructed from the calculated weights and the set of basis of wavelets 54 such that:

$$r_k = A \cdot w = AA^\dagger p \quad \text{Eq. 4}$$

The peak cancellation signal can then be generated as the sum of all of the individual cancellation pulses. The resulting signal can then be subtracted from the original signal at a peak subtractor 62 to provide a peak reduced signal for amplification.

Figure 3:
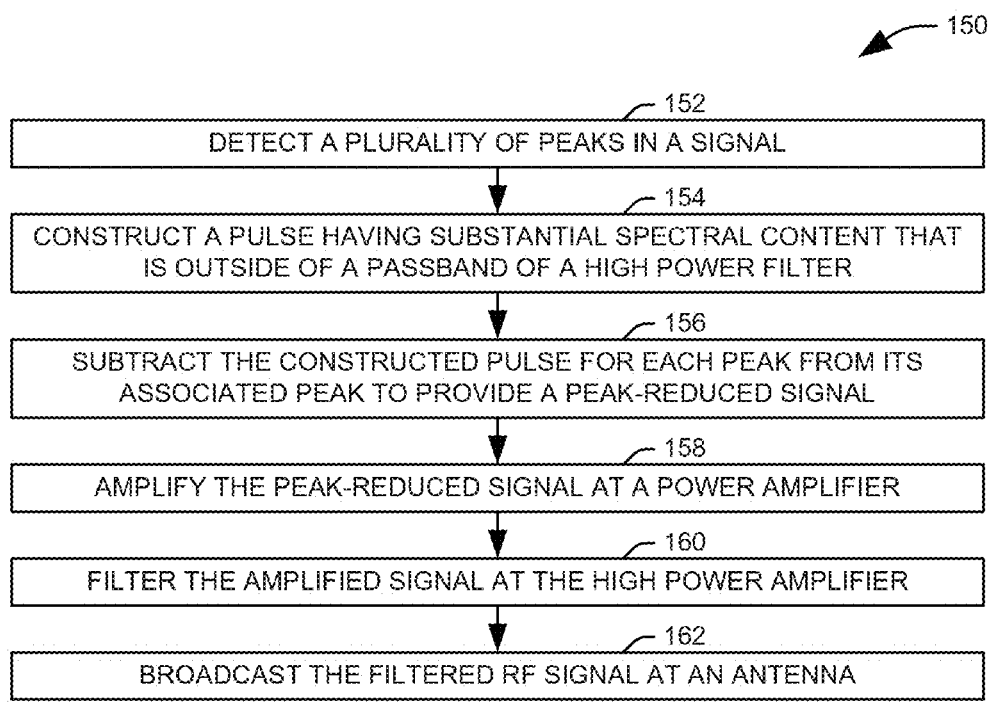
FIG. 3 illustrates an example of a method for broadcasting a signal in accordance with an aspect of the present invention.

In view of the foregoing structural and functional features described above in FIGS. 1 and 2, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates an example of a method 150 for broadcasting a modulated signal in accordance with an aspect of the present invention. At 152, a plurality of peaks is detected within the modulated signal. In one implementation, a clipping function is applied to the signal to provide a magnitude-limited signal, and the magnitude-limited signal is subtracted from the modulated signal to provide a signal representing the peak locations.

At 154, a pulse having substantial spectral content that is outside of a passband of a high power filter is constructed for each of the plurality of peaks. In one implementation, the pulse for each of the plurality of peaks is constructed via an iterative process, starting with a first peak, in which a selected wavelet is scaled to match a magnitude of the selected peak, the scaled wavelet is subtracted from the peak to provide an intermediate signal representing a location of the peak, and a new peak is selected within the intermediate signal. This can continue until a termination event occurs, such as the failure to detect any further peaks in the intermediate signal.

In another implementation, a set of samples is extracted from the modulated signal around a location of the peak and weights are determined for a basis set of wavelets that, when applied to the basis set, approximate the extracted set of samples from around the location of the peak. In one implementation, the basis set of wavelets comprises delayed, overlapping versions of a selected wavelet, for example, a wavelet of the form 1−sin c(t). The weights for the basis set of wavelets can determined via an optimization algorithm as a vector of weights, w, representing an optimal solution to the relationship A·w=p, where A is a matrix representing the basis set of wavelets and p is a vector containing the extracted set of samples from the modulated signal.

At 156, the constructed pulse for each peak is subtracted from its associated peak to provide a peak-reduced signal. At 158, the peak-reduced signal is amplified at a power amplifier to provide an amplified signal. At 160, the amplified signal is filtered at a high power filter to provide a filtered signal, and the filtered signal is broadcast at an associated antenna at 162.

Figure 4:
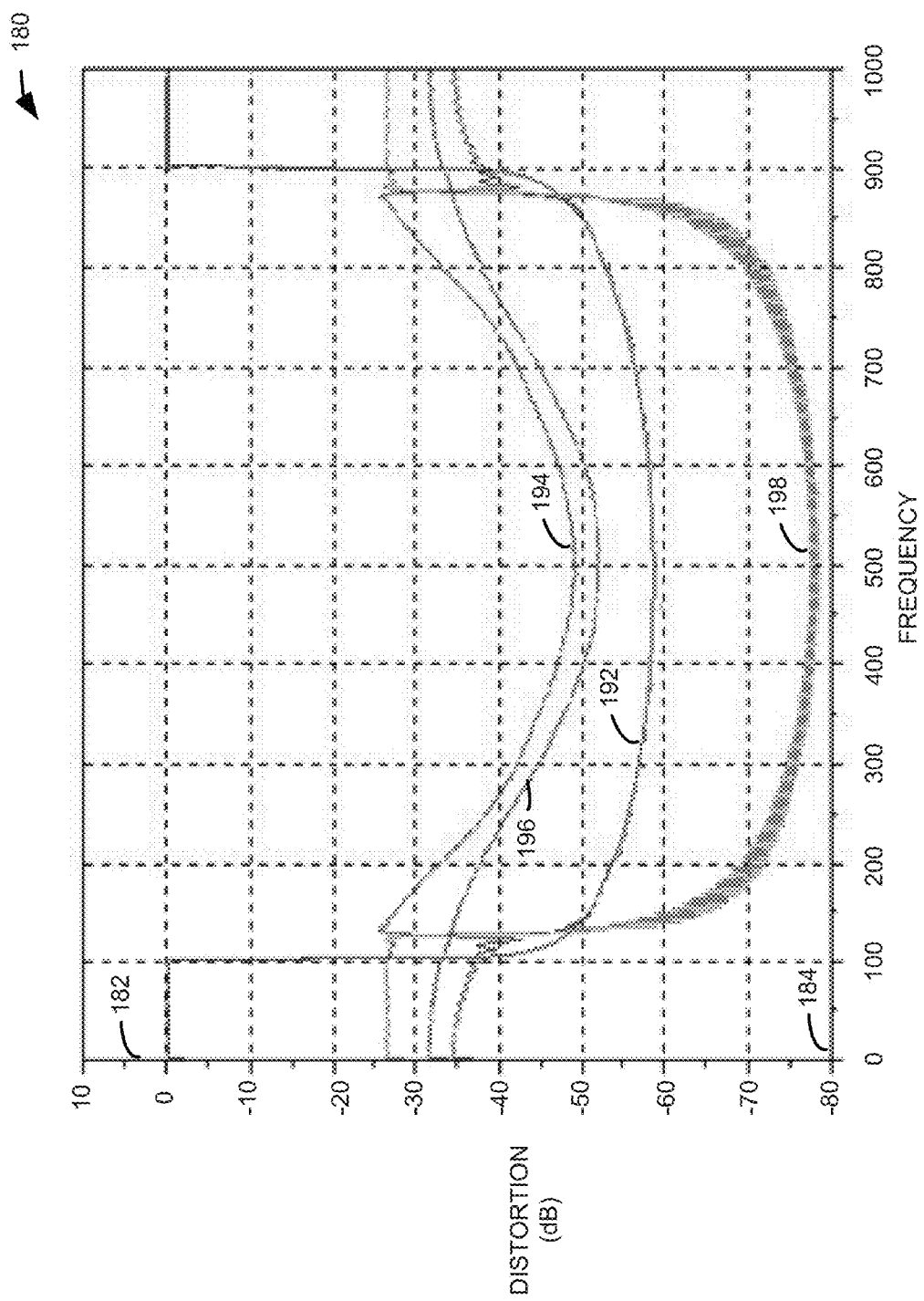

FIG. 4 is a chart 180 illustrating distortion levels produced by various peak-to-average reduction methods across a range of frequencies. A vertical axis 182 represents a distortion level, in decibels, and a horizontal axis 184 represents frequency in normalized units. A first trace 192 represents a spectrum of the original signal. A second trace 194 represents the error when using pulses that have most of their energy outside the bandwidth of the signal for peak to average reduction, as discussed previously. A third trace 196 represents the error after using a simple clipping approach. A fourth trace 198 shows the error between the original signal and the peak to average reduced signal using essentially in-band pulses.

The spectra traces in the figure shows both where the inband distortion and out of band distortion for each method, with the in-band portion of the spectrum represented by the range between 100 and 900 MHz. The trace 194 representing the use of out-of-band pulses has an in-band distortion of 35 dB or better, which is superior to pure clipping 196, and a small part of the spectra outside the signal. But outside this bandwidth the signal has higher distortion, around −25 dB. The high power transmit filter must attenuate this part enough to meet emission standards. But using plain clipping 196, there will be distortion very close to the signal, such that only a filter with a narrow transition band would be able to remove the distortion. Even with a such a filter, the required in-band distortion will limit what peak to average reduction can be reached.

When using in-band peak to average reduction 198, the needed in-band distortion will be around 3 dB higher than the distortion produced by pure clipping. In the illustrated diagram 190, the signal is oversampled, such that about half of the distortion caused by pure clipping ends up in the two adjacent channels. Had the signal not been oversampled, the pure clipping would have resulted in about 3 dB more in-band distortion, as all the distortion would have been in-band. Comparing the in-band distortion when using band-limited pulses 198 compared to out of band pulses 194, the in-band distortion is about 10 dB better. This 10 dB difference is very important in practice for high order QAM signals such as 64 and 256 QAM.

Figure 5:
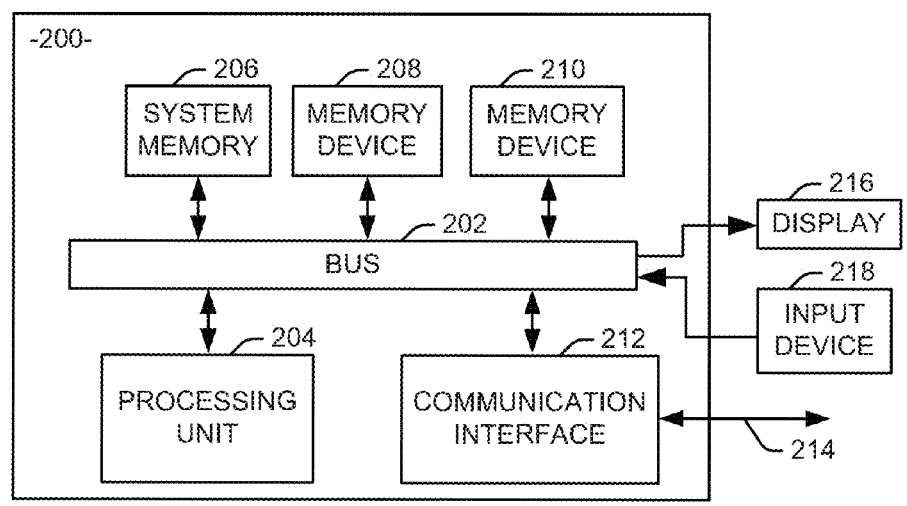
FIG. 4 is a chart illustrating distortion levels produced by various peak-to-average reduction methods across a range of frequencies and FIG. 5 is a schematic block diagram illustrating an exemplary system of hardware components capable of implementing examples of the system disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a peak reduction system in accordance with the present invention. Computer executable logic for implementing the peak reduction resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skills in the art will recognize that many further combinations and permutations of the present invention are possible. Accordingly, the present invention is intended to embrace all such alterations, modifications, and variations that fall within the scope of the appended claims.

What is claimed is:

1. A method for broadcasting a modulated signal, the method comprising:
   detecting a plurality of peaks within a waveform envelope signal of the modulated signal;
   constructing, for each of the plurality of peaks, a pulse having substantial spectral content that is outside of a passband of a high power filter, wherein constructing the pulse for each of the plurality of peaks comprises selecting a first peak and iteratively repeating the following until a termination event occurs:
  scaling a selected wavelet to match a magnitude of the selected peak;
  subtracting the scaled wavelet from the peak to provide an intermediate signal representing a location of the peak; and
  selecting a new peak within the intermediate signal;
subtracting the constructed pulse for each peak from its associated peak to provide a peak-reduced signal;
amplifying the peak-reduced signal at a power amplifier to provide an amplified signal;
filtering the amplified signal at the high power filter to provide a filtered signal; and
broadcasting the filtered signal at an associated antenna.

2. The method of claim 1, wherein constructing the pulse for each of the plurality of peaks comprises:
  extracting a set of samples from the a waveform envelope signal around a location of the peak; and
  determining weights for a basis set of wavelets, that, when applied to the basis set, approximate the extracted set of samples from around the location of the peak.

3. The method of claim 2, wherein determining weights for the basis set of wavelets comprises determining, via an optimization algorithm, a vector of weights, w, representing an optimal solution to the relationship A·w=p, where A is a matrix representing the basis set of wavelets and p is a vector containing the extracted set of samples from the waveform envelope signal.

4. The method of claim 2, wherein the basis set of wavelets comprises delayed, overlapping versions of a selected wavelet.

5. The method of claim 4, wherein the selected wavelet is of the form 1−sin c(t).

6. The method of claim 1, wherein detecting a plurality of peaks within the waveform envelope signal comprises:
  applying a clipping function to the waveform envelope signal to provide a magnitude-limited signal; and
  subtracting the magnitude-limited signal from the waveform envelope signal.

7. A transmitter system comprising:
  a high power filter having a frequency passband;
  a peak-to-average reduction component that detects a plurality of peaks within a waveform envelope signal of a modulated signal, constructs, for each of the plurality of peaks, a pulse having substantial spectral content that is outside of the passband of the high power filter, and subtracts the constructed pulse for each peak from its associated peak to provide a peak-reduced signal;
  a power amplifier that amplifies the peak-reduced signal at a power amplifier to provide an amplified signal, the high power filter filtering the amplified signal to provide a filtered signal; and
  an antenna that broadcasts the filtered signal;
  wherein the peak-to-average reduction component constructs the pulse for each of the plurality of peaks such that the spectral content of the constructed pulse is divided between the passband of the high power filter and a stopband of the high power filter such that an in-band distortion of the filtered signal is substantially equal to a maximum allowable in-band distortion for a transmission protocol associated with the transmitter system.

8. The transmitter system of claim 7, wherein the modulated signal is an orthogonal frequency division multiplexed (OFDM) signal, with a plurality of channels in the OFDM signal each carrying a signal utilizing quadrature amplitude modulation (QAM).

9. The transmitter system of claim 7, further comprising:
  a stored basis set of wavelets having spectral content that is substantially outside of the passband of the high power filter, the basis set of wavelets comprising delayed, overlapping versions of a selected wavelet;
  a sample extractor that extracts a set of samples from the signal around a location of the peak; and
  an optimization component that determines weights for the basis set of wavelets that, when applied to the basis set, approximate the extracted set of samples from around the location of the peak.

10. The transmitter system of claim 9, wherein the selected wavelet is of the form 1−sin c(t).

11. The transmitter system of claim 7, wherein the peak-to-average reduction component that constructs the pulse for each of the plurality of peaks by iteratively scaling a selected wavelet to match a magnitude of the peak, subtracting the scaled wavelet from the peak to provide an intermediate signal representing a location of the peak, and detecting a new peak within the intermediate signal until a termination condition occurs.

12. The transmitter system of claim 7, the peak-to-average reduction component that applies a clipping function to the waveform envelope signal to provide a magnitude-limited signal and subtract the magnitude-limited signal from the waveform envelope signal.

13. A transmitter system comprising:
  a high power filter having a frequency passband;
  a peak-to-average reduction component that detects a plurality of peaks within a modulated signal, constructs, for each of the plurality of peaks, a pulse having substantial spectral content that is outside of the passband of high power filter, and subtracts the constructed pulse for each peak from its associated peak to provide a peak-reduced signal, the peak-to-average reduction component comprising:
    a stored basis set of wavelets having spectral content that is substantially outside of the passband of the high power filter, the basis set of wavelets comprising delayed, overlapping versions of a selected wavelet;
    a sample extractor that extracts a set of samples from the modulated signal around a location of the peak; and
    an optimization component that determines weights for the basis set of wavelets that, when applied to the basis set, approximate the extracted set of samples from around the location of the peak;
  a power amplifier that amplifies the peak-reduced signal to provide an amplified signal, the high power filter filtering the amplified signal to provide a filtered signal; and
  an antenna that broadcasts the filtered signal.

14. The transmitter system of claim 13, wherein the peak-to-average reduction component constructs the pulse for each of the plurality of peaks such that substantially all of the spectral content of the constructed pulse is outside of the passband of the high power filter.

15. The transmitter system of claim 13, wherein the peak-to-average reduction component constructs the pulse for each of the plurality of peaks such that the spectral content of the constructed pulse is divided between the passband of the high power filter and a stopband of the high power filter such that an in-band distortion of the filtered signal is substantially equal to a maximum allowable in-band distortion for a transmission protocol associated with the transmitter system.

16. The transmitter system of claim 13, wherein the optimization component determines, via an optimization algorithm, a vector of weights, w, representing an optimal solution to the relationship $A \cdot w = p$, where A is a matrix representing the basis set of wavelets and p is a vector containing the extracted set of samples from the waveform envelope signal.

17. The transmitter system of claim 13, wherein the modulated signal is an orthogonal frequency division multiplexed (OFDM) signal, with each channel of the OFDM signal utilizing quadrature amplitude modulation (QAM).

* * * * *